United States Patent
Nammoto et al.

(10) Patent No.: US 9,908,237 B2
(45) Date of Patent: Mar. 6, 2018

(54) COMPLIANT MOTION CONTROL FOR ROBOT

(71) Applicants: Seiko Epson Corporation, Tokyo (JP); Tohoku University, Sendai-shi, Miyagi-ken (JP)

(72) Inventors: Takashi Nammoto, Azumino (JP); Kazuhiro Kosuge, Sendai (JP); Abhilasha Saksena, Sendai (JP)

(73) Assignees: Seiko Epson Corporation (JP); Tahoku University (JP)

( * ) Notice: Subject to any disclaimer, the term of this patent is extended or adjusted under 35 U.S.C. 154(b) by 167 days.

(21) Appl. No.: 14/858,287

(22) Filed: Sep. 18, 2015

(65) Prior Publication Data

US 2016/0089788 A1    Mar. 31, 2016

(30) Foreign Application Priority Data

Sep. 29, 2014 (JP) ................................ 2014-198013

(51) Int. Cl.
*B25J 9/06* (2006.01)
*B25J 9/16* (2006.01)

(52) U.S. Cl.
CPC ... *B25J 9/1633* (2013.01); *G05B 2219/39201* (2013.01); *G05B 2219/40032* (2013.01); *Y10S 901/02* (2013.01)

(58) Field of Classification Search
CPC .................. B25J 9/1633; Y10S 901/02; G05B 2219/39201; G05B 2219/40032
USPC ........................................ 700/245, 250, 254
See application file for complete search history.

(56) References Cited

U.S. PATENT DOCUMENTS

| | | | | |
|---|---|---|---|---|
| 4,603,284 A * | 7/1986 | Perzley | ................. | B25J 9/1633 318/568.14 |
| 6,141,863 A * | 11/2000 | Hara | ..................... | B25J 9/1633 29/714 |
| 7,979,159 B2 * | 7/2011 | Fixell | ..................... | B25J 9/1692 700/251 |
| 8,185,263 B2 * | 5/2012 | Kalyanam | .......... | B61L 15/0072 701/19 |
| 8,321,054 B2 * | 11/2012 | Selnes | ................. | G05B 19/423 700/253 |
| 8,626,341 B2 * | 1/2014 | Ando | ..................... | B25J 9/1638 700/260 |
| 8,634,955 B2 * | 1/2014 | Oaki | .................... | G05D 1/0227 15/320 |
| 8,712,589 B2 * | 4/2014 | Nagata | .................. | B25J 9/1633 700/245 |
| 9,317,032 B2 * | 4/2016 | Finkemeyer | .......... | B25J 9/1628 |
| 2011/0153076 A1 * | 6/2011 | Noro | ..................... | B25J 9/1687 700/245 |

(Continued)

FOREIGN PATENT DOCUMENTS

| | | |
|---|---|---|
| JP | 2010-142909 A | 7/2010 |
| JP | 2011-088225 A | 5/2011 |
| JP | 2014-006566 A | 1/2014 |

*Primary Examiner* — Patrick H Mackey
(74) *Attorney, Agent, or Firm* — Harness, Dickey & Pierce, P.L.C.

(57) ABSTRACT

A robot includes an arm and a control unit configured to control a motion of the arm using compliant motion control. The control unit changes a parameter value of the compliant motion control depending on a relative position and orientation of a first object moving along with the arm and a second object.

7 Claims, 14 Drawing Sheets

(56) References Cited

U.S. PATENT DOCUMENTS

2013/0151009 A1\* 6/2013 Okazaki ................ B25J 13/085
　　　　　　　　　　　　　　　　　　　　　　　　700/260

\* cited by examiner

COMPLIANT MOTION CONTROL FOR ROBOT

BACKGROUND

Technical Field

The present invention relates to a robot, a robot system, a control device, and a control method.

Priority is claimed on Japanese Patent Application No. 2014-198013, filed on Sep. 29, 2014, the content of which is incorporated herein by reference.

Related Art

A control method of a robot using compliant motion control (force control) based on an output value from a force sensor has been researched and developed.

A control device or an adjustment device of a robot which determines whether the robot interferes with (that is, comes in contact with) another object based on an output value of a force sensor and which uses position control and force control described in Japanese Unexamined Patent Application, First Publication No. 2010-142909 properly based on the determination result has been known (see Japanese Unexamined Patent Application, First Publication Nos. 2010-142909 and 2011-88225).

An embedded intelligent controller which determines a control variable of impedance control while bringing an object gripped by a robot into contact with another object based on an input jog operation or the like is known (see Japanese Unexamined Patent Application, First Publication No. 2014-6566). Since this controller determines the control variable of impedance control based on movement of the robot by the jog operation or the like, it is possible to simplify a user's instruction operation and to improve convenience.

In the control device described in Japanese Unexamined Patent Application, First Publication No. 2010-142909, since the position control and the force control are switched depending on the magnitude of the output value from the force sensor relative to a predetermined value, the control for the switching is complicated. The magnitude of the force applied to the robot varies with a variation in a contact state between an object gripped by the robot and another object. However, the control device cannot change stiffness of the object gripped by the robot 20 depending on the variation in the contact state between the object gripped by the robot and another object. Accordingly, the control device has a difficulty in carrying out good assembly work.

The adjustment device described in Japanese Unexamined Patent Application, First Publication No. 2011-88225 requires learning of a neural network for determining the switching between the position control and the force control and thus has a problem in that a complicated instruction operation is required for a user.

In the controller described in Japanese Unexamined Patent Application, First Publication No. 2014-6566, since the control variable determined before causing the robot to carry out an operation cannot vary depending on the output value from the force sensor during work, the stiffness of the object gripped by the robot 20 is not changed depending on the variation in the relative position and orientation between the object gripped by the robot and another object, similarly to the control device described in Japanese Unexamined Patent Application, First Publication No. 2010-142909. Accordingly, it is difficult to carry out good assembly work.

SUMMARY

According to an aspect of the invention, a robot, a robot system, a control device, and a control method are provided which can perform compliant motion control based on a variation in a contact state between objects.

According to a first aspect of the present invention, there is provided a robot including: an arm; and a control unit configured to move the arm, wherein the control unit changes a parameter value of compliant motion control depending on a relative position and orientation of a first object moving along with the arm and a second object.

According to this configuration, the robot changes the parameter value of the compliant motion control depending on the relative position and orientation of the first object moving along with the arm and the second object. Accordingly, the robot can perform the compliant motion control depending on a variation in a contact state between objects.

A second aspect of the present invention provides the robot according to the first aspect, wherein the control unit changes the parameter value depending on a movable range of the first object based on the relative position and orientation to the second object.

According to this configuration, the robot changes the parameter value of the compliant motion control depending on the movable range of the first object based on the relative position and orientation to the second object. Accordingly, even when the first object and the second object do not come in contact with each other, the robot can change the parameter value of the compliant motion control depending on the relative position and orientation.

A third aspect of the present invention provides the robot according to the second aspect, wherein the control unit calculates a quantity as an index indicating the difficulty of movement or the ease of movement of the first object depending on the relative position and orientation of the first object and the second object based on the movable range and changes the parameter value based on the calculated quantity as the index.

According to this configuration, the robot calculates the quantity as an index indicating the difficulty of movement or the ease of movement of the first object depending on the relative position and orientation of the first object and the second object based on the movable range of the first object depending on the relative position and orientation to the second object and changes the parameter value of the compliant motion control based on the calculated quantity as the index. Accordingly, the robot can adjust the stiffness of an object so as to decrease the stiffness of the object when it is difficult to move the gripped object, and to increase the stiffness of the object when it is easy to move the gripped object.

A fourth aspect of the present invention provides the robot according to any one of the first to third aspects, wherein the control unit changes a parameter value of impedance control in the compliant motion control.

According to this configuration, the robot changes the parameter value of the impedance control in the compliant motion control. Accordingly, the robot can adjust the stiffness of the object gripped by the robot by changing the parameter value of the impedance control depending on the relative position and orientation of the first object and the second object.

According to a fifth aspect of the present invention, there is provided a robot system including: a robot having an arm; and a control device configured to move the arm, wherein the control device changes a parameter value of the compliant motion control depending on a relative position and orientation of a first object moving along with the arm and a second object.

According to this configuration, the robot system changes the parameter value of the compliant motion control depending on the relative position and orientation of the first object moving along with the arm of the robot and the second object. Accordingly, the robot system can perform the compliant motion control depending on the relative position and orientation between objects.

According to a sixth aspect of the present invention, there is provided a control device that changes a parameter value of compliant motion control depending on a relative position and orientation of a first object moving along with an arm of a robot and a second object.

According to this configuration, the control device changes the parameter value of the compliant motion control depending on the relative position and orientation of the first object moving along with the arm of the robot and the second object. Accordingly, the control device can perform the compliant motion control depending on the relative position and orientation between objects.

According to a seventh aspect of the present invention, there is provided a control method of changing a parameter value of compliant motion control depending on a relative position and orientation of a first object moving along with an arm of a robot and a second object.

According to this configuration, the control method changes the parameter value of the compliant motion control depending on the relative position and orientation of the first object moving along with the arm of the robot and the second object. Accordingly, the control method can perform the compliant motion control depending on the relative position and orientation between objects.

The robot, the robot system, the control device, and the control method according to the aspects of the present invention change the parameter value of the compliant motion control depending on the relative position and orientation of the first object moving along with the arm of the robot and the second object. Accordingly, the robot, the robot system, the control device, and the control method according to the aspects of the present invention can perform the compliant motion control depending on the relative position and orientation between objects.

DETAILED DESCRIPTION OF THE INVENTION

First Embodiment

Figure 1:
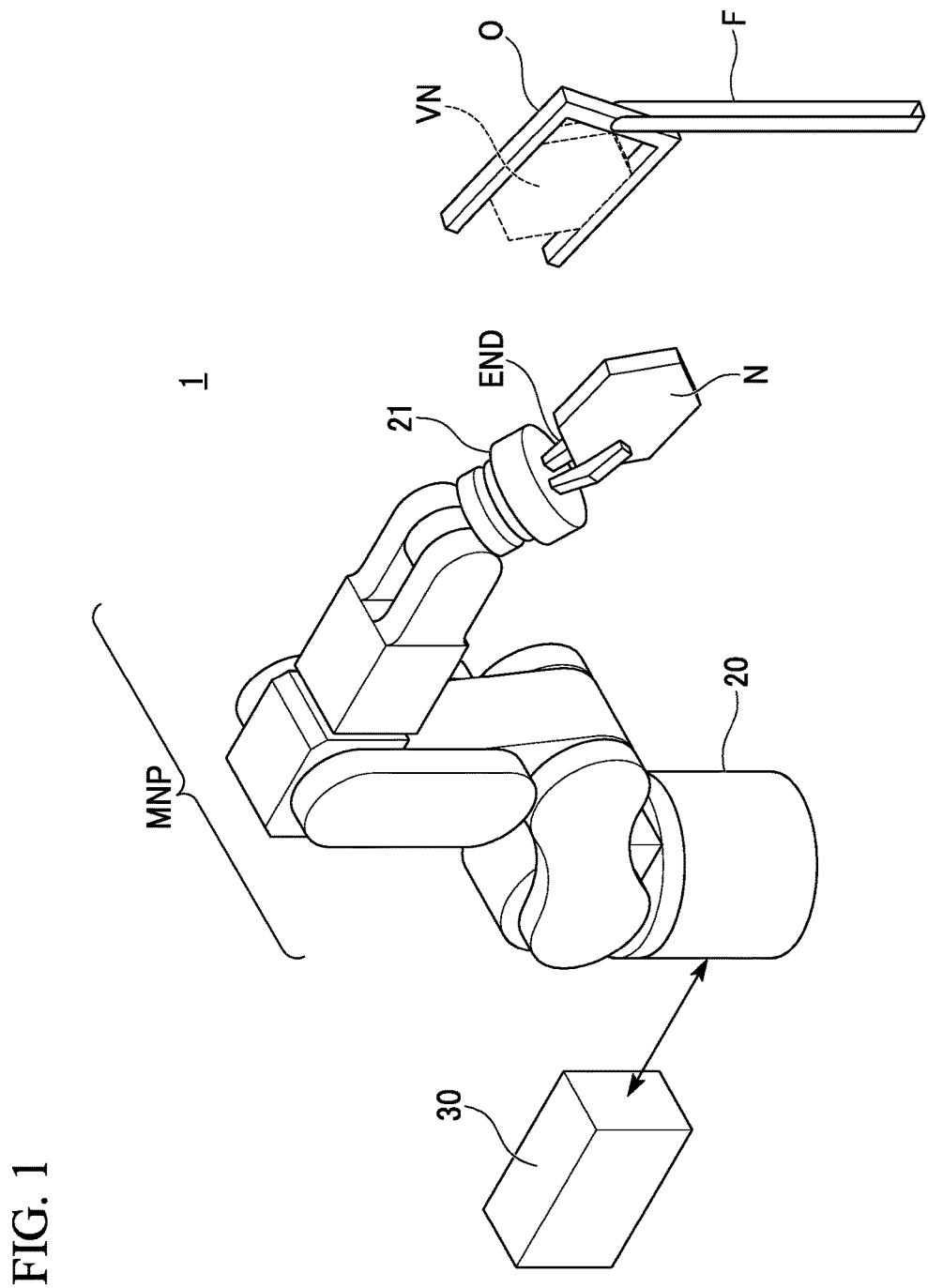
FIG. 1 is a configuration diagram illustrating an example of a robot system according to a first embodiment.

Hereinafter, a first embodiment of the present invention will be described with reference to the accompanying drawings. FIG. 1 is a configuration diagram illustrating an example of a robot system 1 according to the first embodiment. The robot system 1 includes a robot 20 and a control device 30.

The robot system 1 causes the robot 20 to perform an operation while changing a control variable of compliant motion control based on relative position and orientation between an object gripped by the robot 20 and another object. The robot system 1 causes the robot 20 to perform an assembly operation of assembling the object gripped by the robot 20 into another object as an example of the operation. In the following description, for the purpose of convenience of explanation, the object gripped by the robot 20 is referred to as an operation target N and another object is referred to as an assembly target O. The operation target N is an example of the first object, the assembly target O is an example of the second object, the relative position and orientation of the operation target N and the assembly target O is an example of the relative position and orientation. The control variable is an example of a parameter value.

The above-mentioned another object may be any object other than the assembly target O into which the operation target N is assembled, such as an object serving as an obstacle in moving the operation target N and an object disposed such that the position and orientation do not vary with respect to the position and orientation of an origin of coordinates of the robot 20 such as a jig, a wall surface, and a worktable. The origin of coordinates of the robot 20 is, for example, the position and orientation of the gravitational center of a support of the robot 20, but may be the position and orientation of another part of the robot 20. Hereinafter, the assembly operation is referred to as a predetermined operation and a case in which the robot system 1 causes the robot 20 to perform the predetermined operation will be described.

In FIG. 1, the assembly target O is supported by a jig F, but may be installed on a table, a mount, or the like instead. In this case, the position and orientation of the assembly target O is installed so as not to vary with respect to the position and orientation of the origin of coordinates of the robot 20. The operation target N may be a predetermined part of an end effector END or a predetermined part of a manipulator MNP instead of the object gripped by the robot 20.

An object VN indicated by a dotted line in FIG. 1 denotes an operation target N which has been assembled into the assembly target O. In controlling the robot 20 so as to assemble the operation target N into the assembly target O, the robot system 1 controls the robot 20 using compliant motion control as described above. The robot system 1 changes a control variable in the compliant motion control depending on the relative position and orientation of the operation target N and the assembly target O. In the following description, it is assumed that the robot system 1 controls the robot 20 using impedance control as an example of the compliant motion control.

Here, the position and orientation of the operation target N is expressed, for example, based on the position and orientation of the gravitational center of the operation target N, but may be expressed based on the position and orientation of another point moving along with the operation target N. The position and orientation of the assembly target O is expressed, for example, based on the position and orientation of the gravitational center of the assembly target O, but may be expressed based on the position and orientation of another point fixed along with the assembly target O.

The robot 20 is, for example, a single-arm robot including an end effector END having claws capable of gripping an object (the operation target N in this example), a manipulator MNP, a force sensor 21, and a plurality of actuators (not illustrated). The single-arm robot refers to a robot having a single arm including an end effector END and a manipulator MNP (or only a manipulator MNP).

The robot 20 may be a SCARA robot (horizontally-articulated robot), a double-arm robot, or the like instead of the single-arm robot. The SCARA robot is a robot in which the manipulator moves only in the horizontal direction and only a slide shaft of the tip of the manipulator moves in the vertical direction. The double-arm robot is a robot having two arms of which each includes an end effector END and a manipulator MNP (or only a manipulator MNP).

The arm of the robot 20 is a six-axis vertically-articulated type, and the support, the manipulator MNP, and the end effector END can perform a motion with six-axis degrees of freedom by cooperation with the actuators. The arm of the robot 20 may move with five (five-axis) degrees of freedom or less or may move with seven (seven-axis) degrees of freedom or more. In the following description, the operation of the robot 20 which is performed by the arm including the end effector END and the manipulator MNP will be described.

The force sensor 21 is disposed between the end effector END and the manipulator MNP of the robot 20 and detects a force or moment acting on the end effector END (or the operation target N gripped by the end effector END). The force sensor 21 outputs information (hereinafter, referred to as force sensor information) indicating the detected force or moment to the control device 30 by communication. The force sensor information detected by the force sensor 21 is used, for example, for the impedance control of the robot 20 by the control device 30. The force sensor information may be used for other processes.

The robot 20 is connected to the control device 30, for example, via a cable so as to communicate with each other.

The wired communication using a cable is performed, for example, in accordance with a standard such as Ethernet (registered trademark) or Universal Serial Bus (USB). The robot 20 and the control device 30 may be connected to each other by wireless communication which is carried out in accordance with a communication standard such as Wi-Fi (registered trademark). The robot 20 is connected to the control device 30 disposed outside the robot 20 as illustrated in FIG. 1, but the control device 30 may be incorporated into the robot 20.

The robot 20 acquires a control signal based on the relative position and orientation of the operation target N and the assembly target O and the force sensor information detected by the force sensor 21 from the control device 30, and performs a predetermined operation based on the acquired control signal. Hereinafter, for the purpose of convenience of explanation, the relative position and orientation of the operation target N and the assembly target O is simply referred to as the relative position and orientation.

The control device 30 calculates a control variable of the impedance control based on the position and orientation of the assembly target O which is stored in advance and information indicating a working area including the assembly target O which is stored in advance. The working area including the assembly target O refers to, for example, a partial or entire range of a plane or a space including a path through which the gravitational center of the operation target N passes in assembling the operation target N into the assembly target O. In the following description, for the purpose of convenience of explanation, the working area including the assembly target O is simply referred to as a working area. The information indicating the working area is, for example, a combination of coordinates indicating vertices of a rectangle when the working area is a plane having a rectangular shape.

The control device 30 acquires the force sensor information from the force sensor 21 of the robot 20. The control device 30 causes the robot 20 to perform a predetermined operation (that is, an assembly operation of assembling the operation target N into the assembly target O) by the impedance control based on the calculated control variable of the impedance control and the acquired force sensor information.

Figure 2:
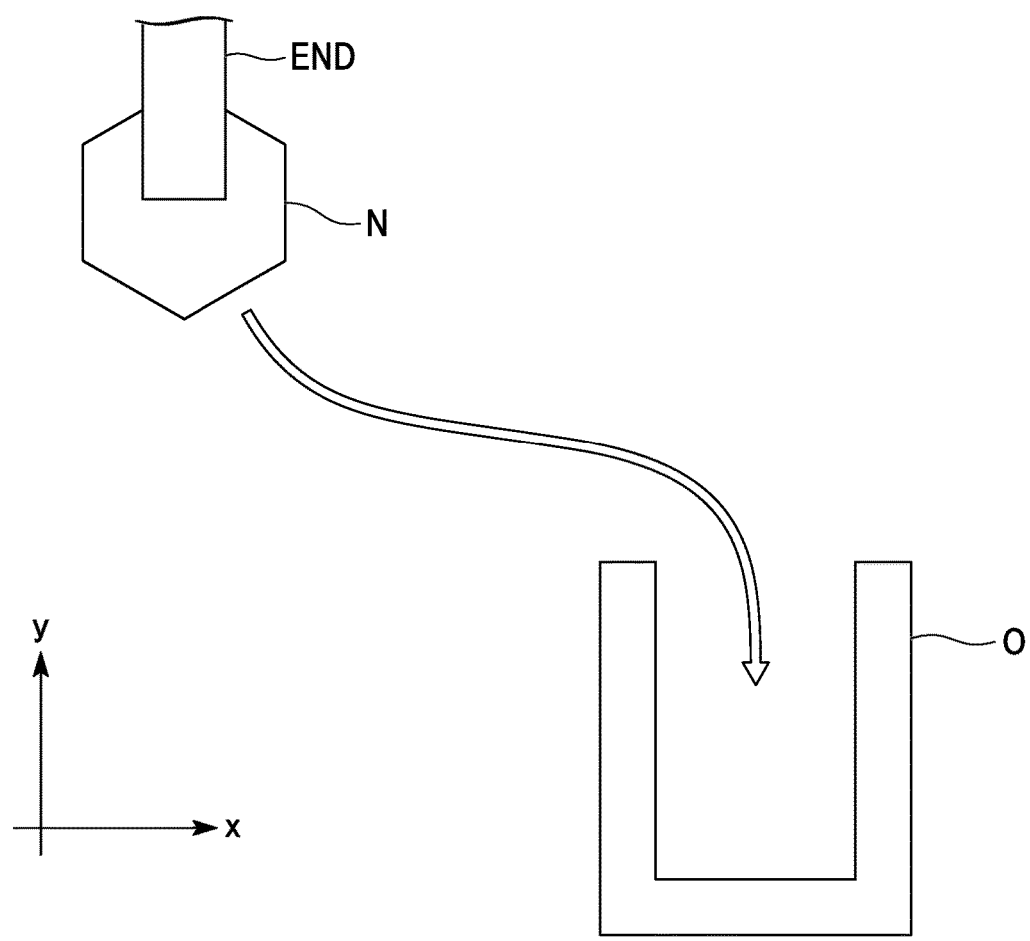
FIG. 2 is a diagram illustrating an example in which a robot moves an operation target along a two-dimensional plane including an assembly target and assembles the operation target into the assembly target.

In the following description, for the purpose of convenience of explanation, it is assumed that the robot 20 moves the operation target N only along a two-dimensional plane (xy plane) including the assembly target O as illustrated in FIG. 2 when the robot 20 assembles the operation target N into the assembly target O based on the control signal from the control device 30. Alternately, the robot 20 may move the operation target N in a three-dimensional space and assemble the operation target N into the assembly target O.

FIG. 2 is a diagram illustrating an example in which the robot 20 moves the operation target N along the two-dimensional plane including the assembly target O and assembles the operation target N into the assembly target O. The x axis and the y axis in FIG. 2 are coordinate axes of the two-dimensional plane (that is, the working area) including the assembly target O. More specifically, the robot system 1 controls the robot 20, for example, so as to assemble the operation target N gripped by the end effector END into the assembly target O along the arrow (the above-mentioned path) illustrated in FIG. 2.

In this assembly, the robot system 1 controls the robot 20 such that the operation target N moves only along the two-dimensional plane expressed by the coordinate axes illustrated in FIG. 2. The path (moving path) through which the operation target N moves is stored in advance in the control device 30, but the control device 30 may calculate the path instead. When the control device 30 calculates the path, for example, the robot system 1 includes an imaging unit capable of imaging a range including the working area and calculates the path based on an image captured by the imaging unit.

Figure 3:
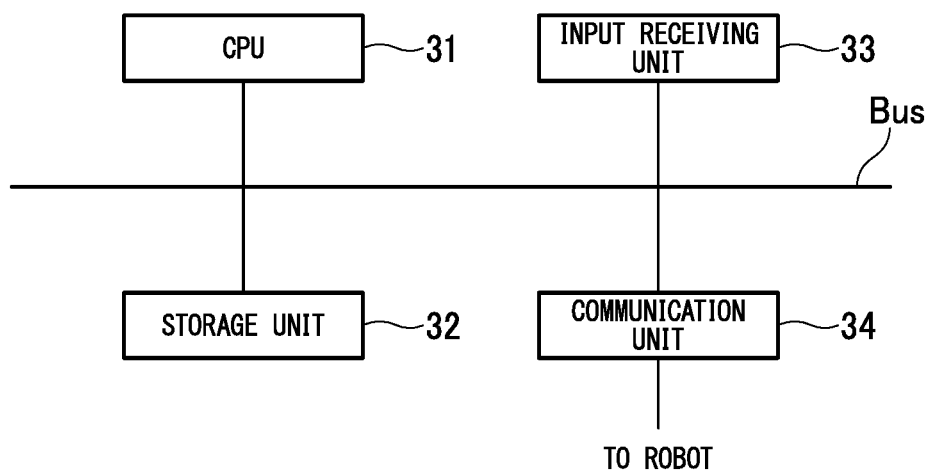
FIG. 3 is a diagram illustrating an example of a hardware configuration of a control device.

The hardware configuration of the control device 30 will be described below with reference to FIG. 3. FIG. 3 is a diagram illustrating an example of the hardware configuration of the control device 30. The control device 30 includes, for example, a central processing unit (CPU) 31, a storage unit 32, an input receiving unit 33, and a communication unit 34 and communicates with the robot 20 via the communication unit 34. These components are connected to each other via a bus BUS so as to communicate with each other. The CPU 31 executes various programs stored in the storage unit 32.

The storage unit 32 includes, for example, a hard disk drive (HDD), a solid state drive (SSD), an electrically erasable programmable read-only memory (EEPROM), a read-only memory (ROM), a random access memory (RAM) and stores a variety of information or images processed by the control device 30, programs, information indicating the position and orientation of the assembly target O, information indicating the working area in performing a predetermined operation, and the like. The storage unit 32 may be an external storage device connected to the control device 30 via a digital input and output port such as a USB without being built in the control device 30.

The input receiving unit 33 is an input device such as a keyboard, a mouse, or a touch pad. The input receiving unit 33 may be integrally formed as a touch panel with a display unit.

The communication unit 34 includes a digital input and output port such as a USB or a port such as Ethernet (registered trademark).

Figure 4:
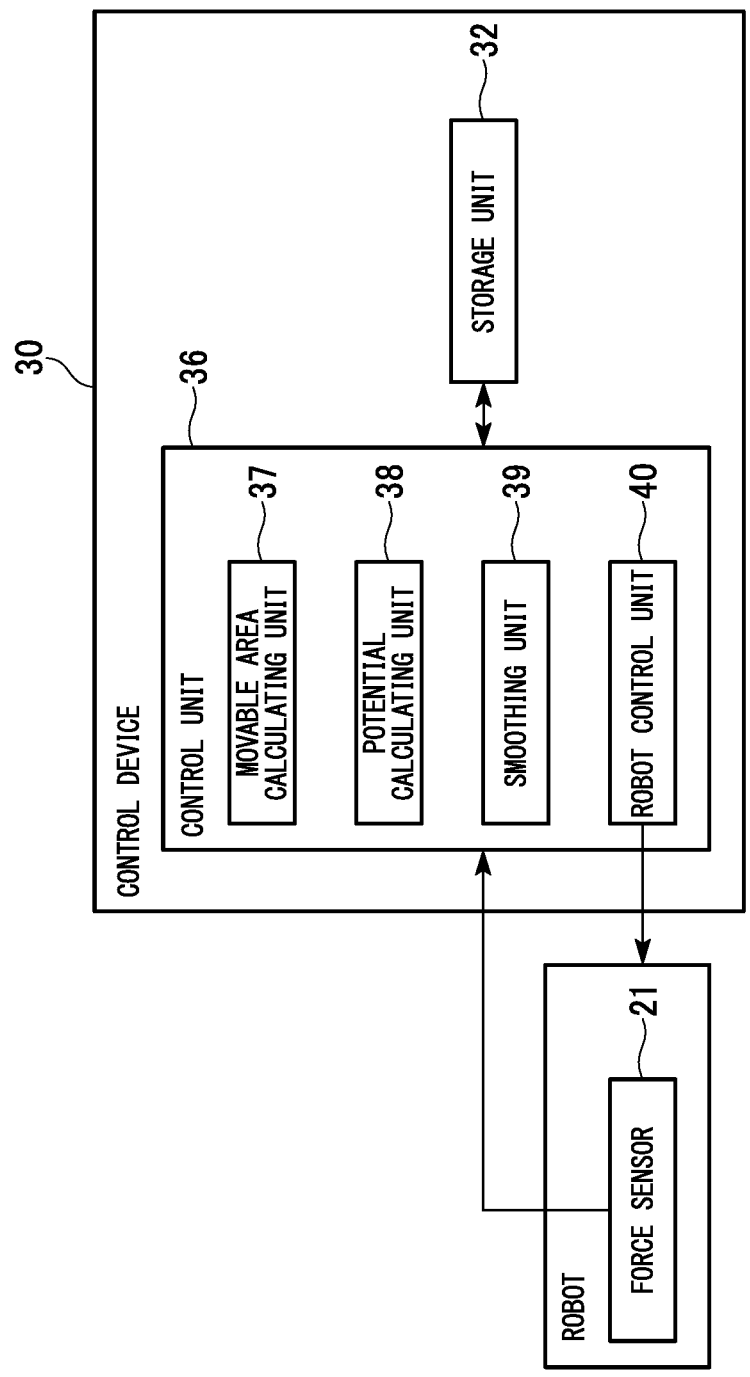
FIG. 4 is a diagram illustrating an example of a functional configuration of the control device.

The functional configuration of the control device 30 will be described below with reference to FIG. 4. FIG. 4 is a diagram illustrating an example of the functional configuration of the control device 30. The control device 30 includes a storage unit 32 and a control unit 36. All or a part of the functional units of the control unit 36 are embodied, for example, by causing the CPU 31 to execute various programs stored in the storage unit 32. All or a part of the functional units may be a hardware functional unit such as a large scale integration (LSI) chip or an application specific integrated circuit (ASIC).

The control unit 36 controls the control device 30 as a whole. The control unit 36 includes a movable area calculating unit 37, a potential calculating unit 38, a smoothing unit 39, and a robot control unit 40.

The movable area calculating unit 37 reads the information indicating the position and orientation of the assembly target O and the information indicating the working area from the storage unit 32. In the following description, for the purpose of convenience of explanation, the position and orientation of the assembly target O is referred to as the assembly target position and orientation. The movable area calculating unit 37 calculates a movable area of the operation target N based on the read information indicating the assembly target position and orientation and the read information indicating the working area.

The information indicating the assembly target position and orientation is stored in the storage unit 32 in advance, but the robot system 1 may include an imaging unit and the information may be detected based on an image captured by the imaging unit, instead. The information indicating the working area is stored in the storage unit 32 in advance, but the robot system 1 may include an imaging unit and the information may be detected based on an image captured by the imaging unit, instead.

Here, the movable area of the operation target N is a quantity which is defined at each point in the working area and is a quantity quantitatively indicating a range in which the operation target N can move without coming in contact with the assembly target O in the working area. In this example, the movable area of the operation target N is a quantity which is defined by two quantities of the sum of distances (hereinafter, referred to as a translational movable area) by which the operation target N can move in the x direction and the y direction from a certain point on a two-dimensional plane indicating the working area without coming in contact with the assembly target O in the two-dimensional plane and the sum of rotational angles (hereinafter, referred to as a rotational movable area) by which the operation target N can rotate in the positive direction (for example, a counterclockwise direction) and the negative direction (for example, the clockwise direction) at that point without coming in contact with the assembly target O, and is a quantity which is defined at each point in the two-dimensional plane.

The movable area of the operation target N may be defined by another quantity associated with the operation target N at each point in the working area. The movable area of the operation target N is not defined at each point in the working area, but may be defined, for example, for each sub-area when the working area is divided into a plurality of sub-areas. The movable area calculating unit 37 may calculate any one of the translational movable area and the rotational movable area (that is, the movable area of the operation target N is defined by any one of the translational movable area and the rotational movable area) rather than calculating both of the translational movable area and the rotational movable area.

The potential calculating unit 38 calculates a quantity as an index indicating the difficulty of movement (or the ease of movement) of the operation target N at each point in the working area based on the movable area of the operation target N (one or both of the translational movable area and the rotational movable area) calculated by the movable area calculating unit 37. Hereinafter, this quantity calculated at each point in the working area by the potential calculating unit 38 is referred to as a potential. This potential is calculated at each point in the working area in this embodiment, and thus is expressed as a function of coordinates indicating the point in the working area.

This is because the stiffness of the operation target N at each point in the working area, that is, the quantity as an index indicating the difficulty of movement (or the ease of movement) of the operation target N gripped by the end effector END, is likened to potential energy associated with a conservative force acting on an object at a point in a space. Since the position and orientation of the assembly target O in the working area does not vary, the position and orientation of an object (for example, the operation target N) in the working area represents the relative position and orientation of the operation target N and the assembly target O. Accordingly, in other words, the potential calculating unit 38 calculates the quantity as an index indicating the difficulty of movement of the operation target N depending on the relative position and orientation of the operation target N and the assembly target O as a potential at each point in the working area.

The smoothing unit 39 smoothes (that is, averages) the function indicating the potential by applying a low-pass filter to the function indicating the potential at each point in the working area calculated by the potential calculating unit 38. Hereinafter, for the purpose of convenience of explanation, when the smoothing unit 39 converts the function indicating the potential in this way, it will be referred to that the smoothing unit 39 generates a smooth potential. In the following description, it is assumed that the function indicating the potential before applying the low-pass filter is a discontinuously-varying potential. When it is wanted to control the robot 20 based on the discontinuously-varying potential, for example, it may impose a burden on actuators or the like and may cause a breakdown. Accordingly, smoothing unit 39 generates a smooth potential by applying the low-pass filter to the calculated discontinuously-varying potential.

The robot control unit 40 reads information indicating the relative position and orientation of the TCP of the robot 20 and the operation target N and information indicating the working area from the storage unit 32. The robot control unit 40 calculates the position and orientation of the operation target N (that is, the relative position and orientation of the operation target N and the assembly target O) in the working area based on the rotational angles of the actuators of the robot 20 and the information indicating the relative position and orientation of the TCP of the robot 20 and the operation target N and the working area. The robot control unit 40 acquires the force sensor information from the force sensor 21. The robot control unit 40 causes the robot 20 to perform a predetermined operation by impedance control based on the calculated position and orientation of the operation target N in the working area, the smooth potential generated by the smoothing unit 39, and the force sensor information acquired from the force sensor 21. Here, the information indicating the relative position and orientation of the TCP of the robot 20 and the operation target N is stored in advance in the storage unit 32, but the robot system 1 may include an imaging unit and the information is calculated or detected based on an image captured by the imaging unit.

Figure 5:
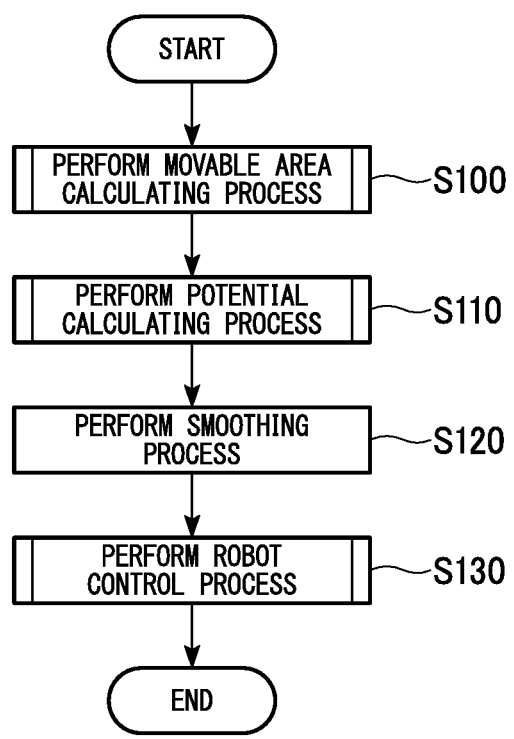
FIG. 5 is a flowchart illustrating an example of a process flow until the control device calculates a movable area of an operation target and performs a predetermined operation.

A process flow until the control device 30 calculates the movable area of the operation target N and performs a predetermined operation will be described below with reference to FIG. 5. FIG. 5 is a flowchart illustrating an example of a process flow until the control device 30 calculates the movable area of the operation target N and performs a predetermined operation. In the following description, for example, it is assumed that the robot 20 grips the operation target N with the end effector END thereof.

(Step S100) First, the movable area calculating unit 37 performs a movable area calculating process of calculating the movable area of the operation target N.

In this example, the movable area calculating process includes two processes of a translational movable area calculating process and a rotational movable area calculating process. The translational movable area calculating process is a process of calculating the translational movable area of the operation target N at each point in the working area. The rotational movable area calculating process is a process of calculating the rotational movable area of the operation target N at each point in the working area. In the movable area calculating process of step S100, the movable area calculating unit 37 may first perform any one of the translational movable area calculating process and the rotational movable area calculating process or may simultaneously perform both. As described with reference to FIG. 4, the movable area calculating unit 37 may perform any one of the translational movable area calculating process and the rotational movable area calculating process in the movable area calculating process.

(Step S110) Then, the potential calculating unit 38 performs a potential calculating process of calculating a potential at each point in the working area based on one or both of the translational movable area and the rotational movable area of the operation target N calculated by the movable area calculating unit 37 in step S100. In this embodiment, it is assumed that the potential calculating unit 38 calculates a potential at each point in the working area based on both of the translational movable area and the rotational movable area of the operation target N in the potential calculating process.

(Step S120) Then, the smoothing unit 39 generates (smoothes) the smoothly-varying potential by applying the low-pass filter to the discontinuously-varying potential calculated in step S110.

(Step S130) Then, the robot control unit 40 performs a robot control process of causing the robot 20 to perform a predetermined operation by impedance control based on the smooth potential generated by the smoothing unit 39 in step S120.

Figure 6:
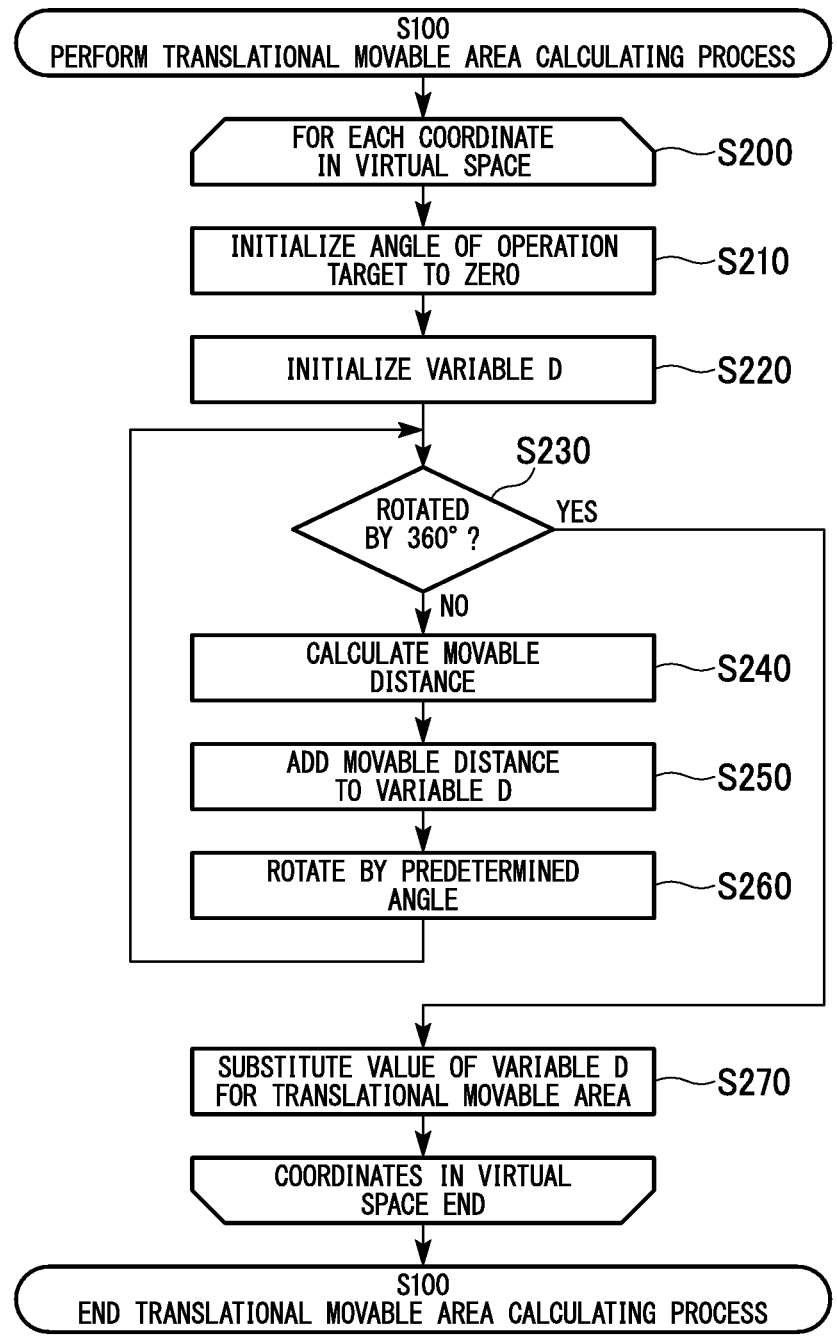
FIG. 6 is a flowchart illustrating an example of a process flow of a translational movable area calculating process in a movable area calculating process of step S100 illustrated in FIG. 5.

The movable area calculating process of step S100 illustrated in FIG. 5 will be described below with reference to FIGS. 6 and 7. FIG. 6 is a flowchart illustrating an example of a process flow of the translational movable area calculating process in the movable area calculating process of step S100 illustrated in FIG. 5.

(Step S200) First, the movable area calculating unit 37 reads the information indicating the working area from the storage unit 32 and generates a virtual space indicating the working area based on the read information indicating the working area. Then, the movable area calculating unit 37 selects coordinates indicating points in the generated virtual space one by one and repeatedly performs the processes of steps S210 to S270 for each selected coordinate.

(Step S210) Then, the movable area calculating unit 37 virtually arranges the operation target N at the point in the virtual space indicated by the coordinates selected in step S200. At this time, the movable area calculating unit 37 arranges the operation target N such that the position of the gravitational center of the operation target N matches the point in the virtual space. The movable area calculating unit 37 initializes the posture of the operation target N arranged at the point in the virtual space to a predetermined initial posture. The predetermined initial posture is, for example, a posture in which an angle formed by a predetermined central line passing through the gravitational center of the operation target N and the x axis or the y axis is zero, but is not limited to this example and may be another posture.

(Step S220) Then, the movable area calculating unit 37 generates a variable D, which can store information indicating a numerical value, and initializes the value of the variable D to zero.

(Step S230) Then, the movable area calculating unit 37 determines whether the accumulated value of the rotational angles associated with the rotation of the operation target N in step S260 reaches 360°.

(Step S240: NO in step S230) When it is determined that the accumulated value of the rotational angles associated with the rotation of the operation target N does not reach 360°, the movable area calculating unit 37 calculates the sum of distances by which the operation target N arranged at the point in the virtual space indicated by the coordinates selected in step S200 can move in the positive x-axis direction, the negative x-axis direction, the positive y-axis direction, and the negative y-axis direction (hereinafter, referred to as four directions).

The sum of movable distances calculated by the movable area calculating unit 37 may be a moving distance in any one of the four directions instead of the sum of movable distances in the four directions, may be the sum of some combinations of movable distances in the four directions, the sum of movable distances in one or more different directions (the movable distance in the direction, not the sum, when there is only one different direction), or may be the sum of the movable distances in the four directions and the movable distance in a different direction. For example, when the sum of movable distances in one or more different directions (for example, a direction (tilt direction) between the extending direction in the X axis and the extending direction of the y axis, or the like) is calculated as the sum of distance by which the operation target N can move, the movable area calculating unit 37 may calculate the distances in the direction using a method of calculating a distance in a metric space such as Pythagorean theorem.

(Step S250) Then, the movable area calculating unit 37 adds the sum of movable distances in the four directions calculated in step S240 to the value stored in the variable D generated in step S220.

(Step S260) Then, the movable area calculating unit 37 rotates the posture of the operation target N arranged at the point in the virtual space indicated by the coordinates selected in step S200 by a predetermined angle. The predetermined angle is preferably an arbitrary angle including 360° □ as a multiple thereof and may be 5° or 10° in an example, but may be another angle not including 360° as a multiple thereof.

Briefly summarizing the processes of steps S230 to S260, the movable area calculating unit 37 varies the posture of the operation target N arranged at the point in the virtual space indicated by the coordinates selected in step S200 by every predetermined angle, calculates the sum of movable distances in the four directions for each posture, and adds the calculated sum of movable distances in the four directions for each posture to the variable D.

Figure 8:
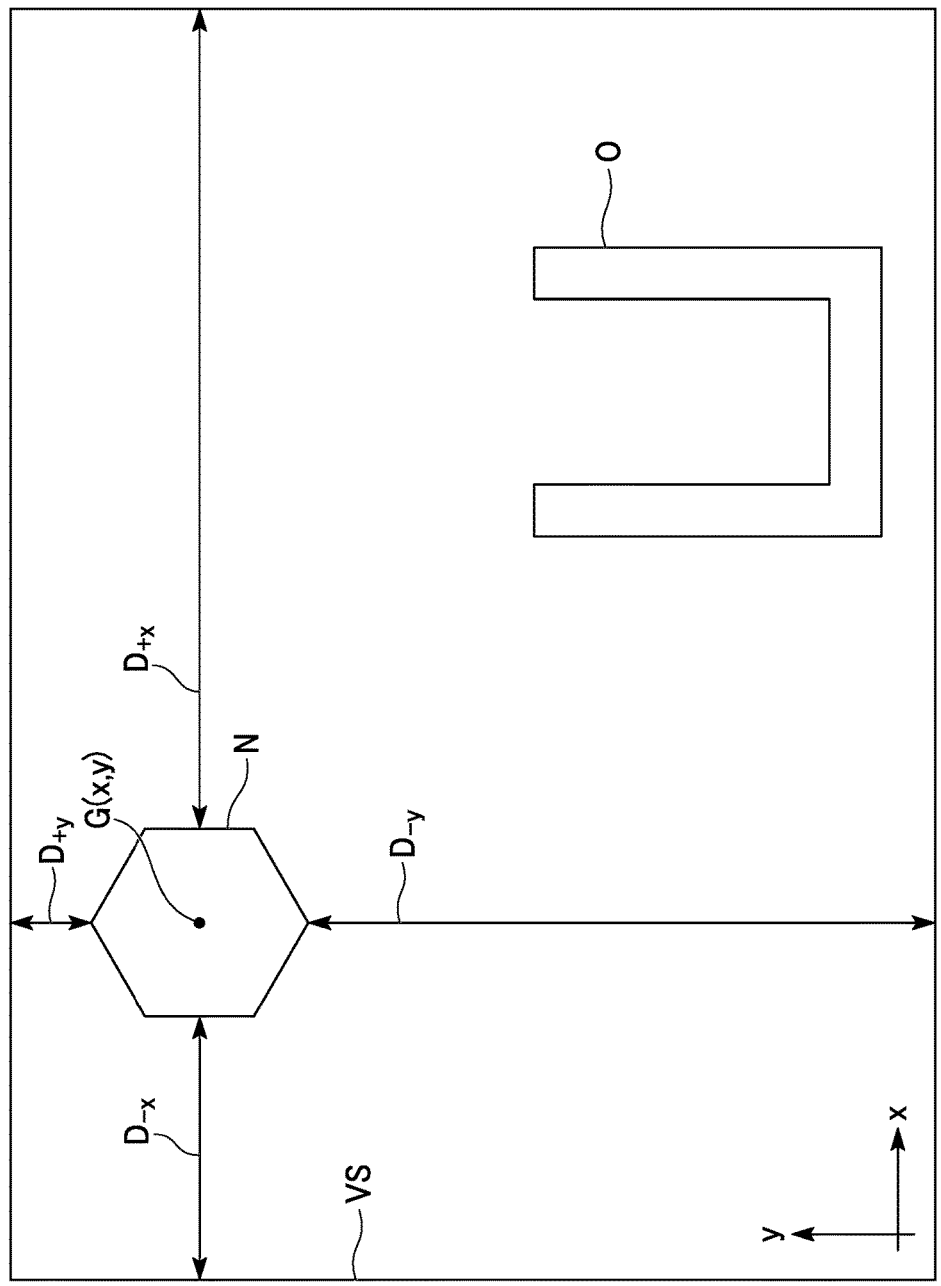
FIG. 8 is a diagram illustrating an example of an operation target disposed at a point in a virtual space indicated by coordinates selected in step S100.

The processes of steps S230 to S260 will be described below with reference to FIG. 8. FIG. 8 is a diagram illustrating an example of the operation target N arranged at the point in the virtual space indicated by the coordinates selected in step S100. In FIG. 8, it is assumed that coordinates (x, y) are the coordinates selected in step S200. The point G(x, y) represents the position of the gravitational center of the operation target N arranged at the coordinates (x, y). The frame VS represents the virtual space, which indicates the working area, generated by the movable area calculating unit 37. In the following description, it is assumed that the range surrounded by the frame VS is a virtual space VS. The coordinate axes illustrated in FIG. 8 are coordinate axes indicating the position and orientation in the virtual space VS. The posture of the operation target N illustrated in FIG. 8 is defined as a predetermined initial posture.

The movable area calculating unit 37 moves the operation target N arranged at the coordinates (x, y) in the above-mentioned four directions. At this time, the movable area calculating unit 37 calculates moving distances when the operation target N is moved until the profile of the operation target N interferes with (that is, comes in contact with) the frame of the virtual space VS or the profile of the assembly target O as the movable distances in the four directions. In FIG. 8, the distance $D_{+x}$ is a movable distance in the positive x-axis direction, and the distance $D_{-x}$ is a movable distance in the negative x-axis direction. In FIG. 8, the distance $D_{+y}$ is a movable distance in the positive y-axis direction, and the distance $D_{-y}$ is a movable distance in the negative y-axis direction. The movable area calculating unit 37 adds the sum of the distances $D_{+x}$, $D_{-x}$, $D_{+y}$, and $D_{-y}$ to the value stored in the variable D.

Then, the movable area calculating unit 37 changes the posture of the operation target N by a predetermined angle up to 360°, calculates the sum of movable distances in the four directions at each posture whenever the posture is changed by the predetermined angle, and adds the calculated sum of the movable distances in the four directions to the value stored in the variable D. The sum of the movable distances in the four directions varies depending on the position and orientation of the operation target N. Accordingly, the value added to the variable D is a value based on the position and orientation of the operation target N. In this way, the movable area calculating unit 37 performs the processes of steps S230 to S260.

(Step S270: YES in step S230) When it is determined in step S230 that the accumulated value of the rotational angles associated with the rotation of the operation target N reaches 360°, the movable area calculating unit 37 sets the value stored in the variable D as the translational movable area $F_t$ at the coordinates selected in step S100 and then selects the next coordinates in the virtual space again in step S200. In the following description, when the coordinates indicating each point in the virtual space VS are defined as coordinates (x, y), the value of the translational movable area $F_t$ at the coordinates is referred to as a translational movable area $F_t(x, y)$. The coordinates indicating each point in the virtual space and the coordinates indicating each point in the working area are correlated with each other in advance by calibration or the like. Accordingly, the points in the virtual space VS represent the points in the working area.

Figure 7:
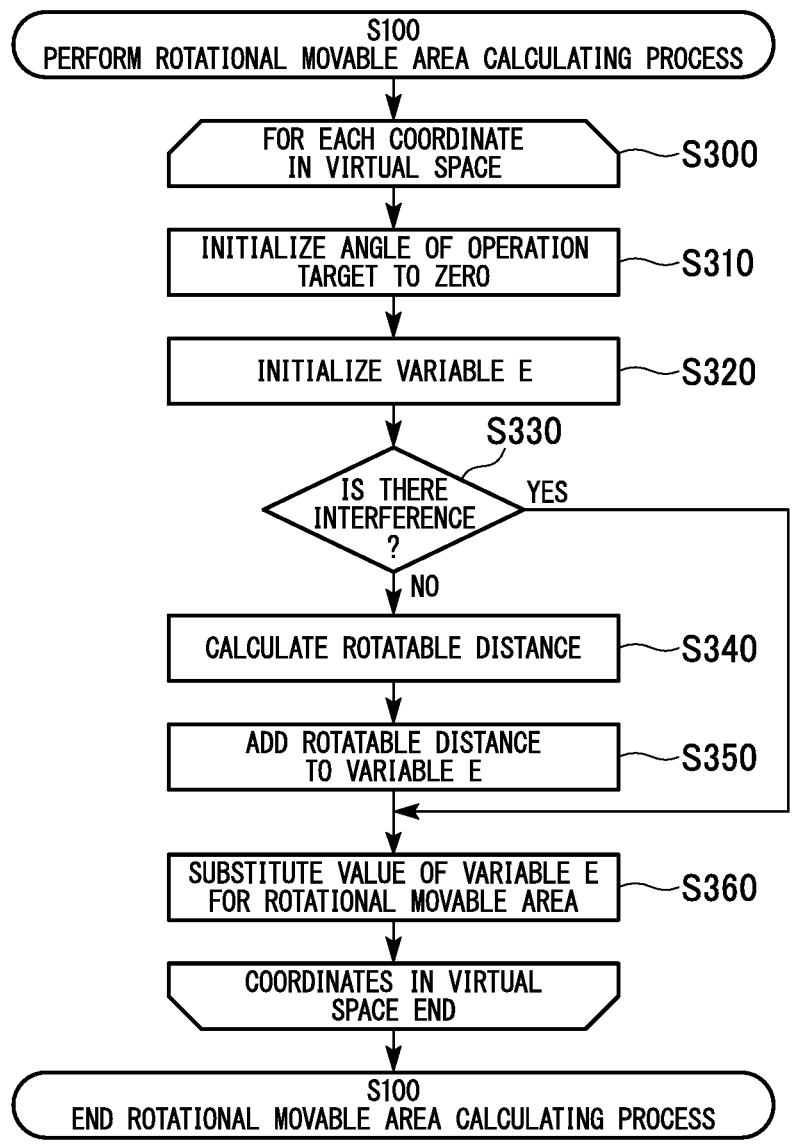
FIG. 7 is a flowchart illustrating an example of a process flow of a rotational movable area calculating process in the movable area calculating process of step S100 illustrated in FIG. 5.

FIG. 7 is a flowchart illustrating an example of a process flow of the rotational movable area calculating process in the movable area calculating process of step S100 illustrated in FIG. 5.

(Step S300) First, the movable area calculating unit 37 reads the information indicating the working area from the storage unit 32 and generates a virtual space representing the working area based on the read information indicating the working area. Then, the movable area calculating unit 37 selects the coordinates indicating the points in the generated virtual space one by one and repeatedly performs the processes of steps S310 to S360 for each selected coordinate. When the rotational movable area calculating process is performed after the translational movable area calculating process illustrated in FIG. 6 (or in parallel with the translational movable area calculating process) by the movable area calculating unit 37, the virtual space is already generated and thus a new virtual space may not be generated in step S300.

(Step S310) First, the movable area calculating unit 37 virtually arranges the operation target N at a point in the virtual space indicated by the coordinates selected in step S300. At this time, the movable area calculating unit 37 arranges the operation target N such that the position of the gravitational center of the operation target N matches the point in the virtual space. The movable area calculating unit 37 initializes the posture of the operation target N arranged at the point in the virtual space to the predetermined initial posture.

(Step S320) Then, the movable area calculating unit 37 generates a variable E which can store information indicating a numerical value and initializes the value of the variable E to zero.

(Step S330) Then, the movable area calculating unit 37 determines whether the operation target N arranged at the point in the virtual space indicated by the coordinates selected in step S300 interferes with (that is, comes in contact with) the frame of the virtual space VS illustrated in FIG. 8 or the profile of the assembly target O at this time.

(Steps S340 and S350: NO in step S330) When it is determined that the operation target N does not come in contact with the frame of the virtual space VS or the profile of the assembly target O, the movable area calculating unit 37 rotates the operation target N arranged at the point in the virtual space indicated by the coordinates selected in step S300, for example, in the positive direction and the negative direction with respect to the gravitational center of the operation target N until the profile of the operation target N comes in contact with the frame of the virtual space VS or the profile of the assembly target O. When the profile of the operation target N does not come in contact with the frame of the virtual space VS or the profile of the assembly target O, the rotational angles in the positive direction and the negative direction are set to 360°. The movable area calculating unit 37 calculates the sum of the rotational angle in the positive direction and the rotational angle in the negative direction as a rotatable angle and adds the rotatable angle to the value stored in the variable E.

(Step S360: YES in step S330) On the other hand, when it is determined in step S330 that the operation target N interferes (that is, comes in contact with) the frame of the virtual space VS or the profile of the assembly target O, the movable area calculating unit 37 sets the value stored in the variable E as the rotational movable area $F_r$ and then selects the next coordinates in the virtual space again in step S300. In the following description, when the coordinates indicating each point in the virtual space VS are defined as coordinates (x, y), the value of the rotational movable area $F_r$ at the coordinates is referred to as a rotational movable area $F_r(x, y)$.

Figure 9:
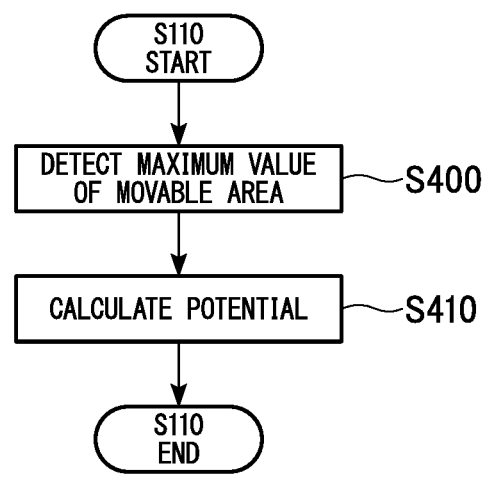
FIG. 9 is a flowchart illustrating a process flow of a potential calculating process of step S110 illustrated in FIG. 5.

The potential calculating process of step S110 illustrated in FIG. 5 will be described below with reference to FIG. 9. FIG. 9 is a flowchart illustrating an example of a process flow of the potential calculating process of step S110 illustrated in FIG. 5.

(Step S400) First, the potential calculating unit 38 detects a maximum value $F_{tMAX}$ at all the points of the translational movable area $F_t(x, y)$ and a maximum value $F_{rMAX}$ at all the points of the rotational movable area $F_r(x, y)$ based on the movable area at each point in the virtual space VS (that is, each point in the working area) calculated in step S100 by the movable area calculating unit 37, that is, the translational movable area $F_t(x, y)$ and the rotational movable area $F_r(x, y)$.

(Step S410) Then, the potential calculating unit 38 calculates the potential at each point in the working area based on the maximum value $F_{tMAX}$ of the translational movable area $F_t(x, y)$ and the maximum value $F_{tMAX}$ of the rotational movable area $F_r(x, y)$ which are detected in step S400. Here, the process of calculating the potential will be described below. The potential calculating unit 38 calculates the potential at each point in the working area based on Equations (1) and (2).

$$P_t(x,y) = F_{tMAX} - F_t(x,y) \tag{1}$$

$$P_r(x,y) = F_{rMAX} - F_r(x,y) \tag{2}$$

Here, $P_t(x, y)$ represents the potential at the coordinates (x, y) indicating a certain point in the working area and represents the potential calculated based on the translational movable area (hereinafter, referred to as translational potential). $P_r(x, y)$ represents the potential at the coordinates (x, y) indicating a certain point in the working area and represents the potential calculated based on the rotational movable area (hereinafter, referred to as rotational potential).

Equation (1) is an equation for defining a value, which is obtained by subtracting the translational movable area $F_t(x, y)$ at the coordinates (x, y) indicating a certain point in the working area from the maximum value $F_{tMAX}$ of the translational movable area, as the translational potential at the coordinates (x, y). By defining the translational potential in this way, it can be expressed that the stiffness of the operation target N gripped by the end effector END is large, that is, it is difficult to move the operation target N (difficult to translate the operation target), at a point having a large translation potential among the points in the working area.

Equation (2) is an equation for defining a value, which is obtained by subtracting the rotational movable area $F_r(x, y)$ at the coordinates (x, y) indicating a certain point in the working area from the maximum value $F_{rMAX}$ of the rotational movable area, as the rotational potential at the coordinates (x, y). By defining the rotational potential in this way, it can be expressed that the stiffness of the operation target N gripped by the end effector END is large, that is, it is difficult to move the operation target N (difficult to rotate the operation target), at a point having a large translation potential among the points in the working area.

Figure 10A:
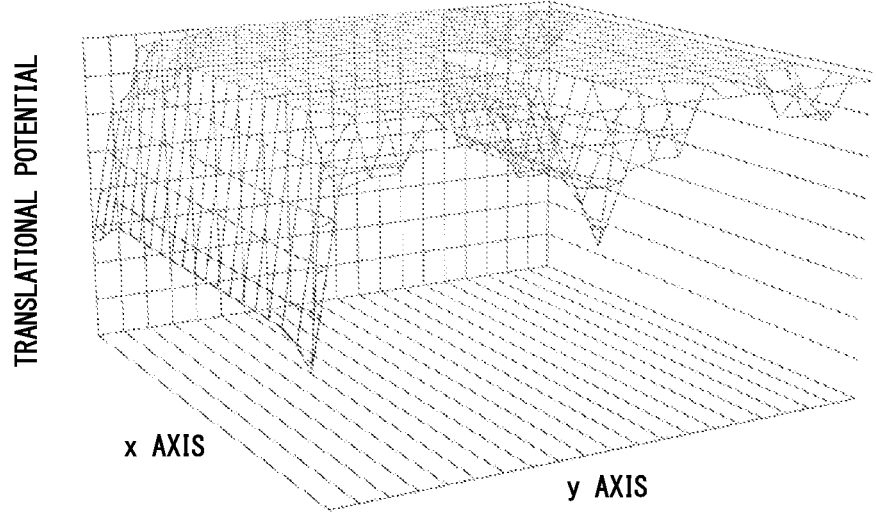
FIGS. 10A and 10B are a graph illustrating an example of calculated translational potential and a graph illustrating an example of calculated rotational potential.
Figure 10B:
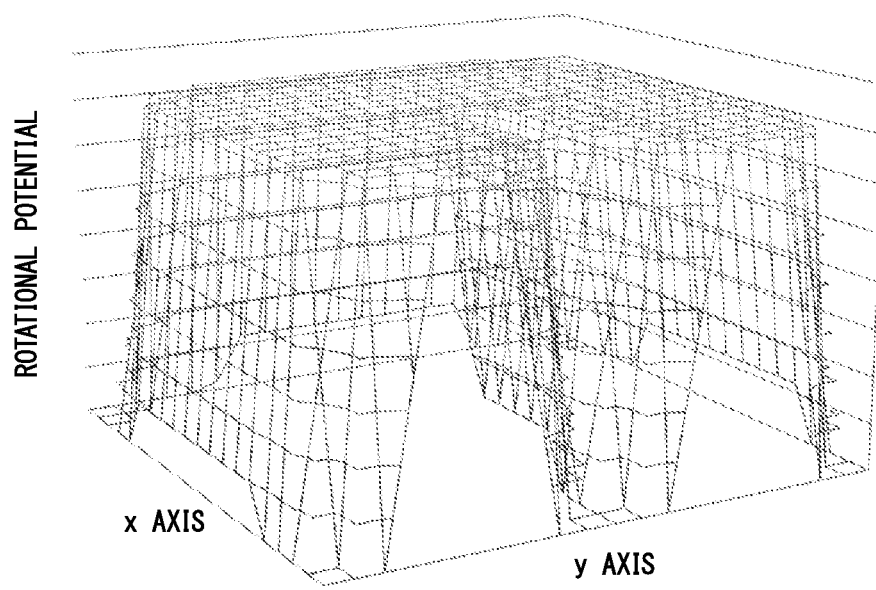

FIGS. 10A and 10B are a graph illustrating an example of the calculated translational potential and a graph illustrating an example of the calculated rotational potential. FIG. 10A shows a graph illustrating an example of the translational potential. FIG. 10B shows a graph illustrating an example of the rotational potential. From these graphs, it can be seen that the translational potential and the rotational potential calculated by the potential calculating unit 38 discontinuously vary in magnitude.

Figure 11:
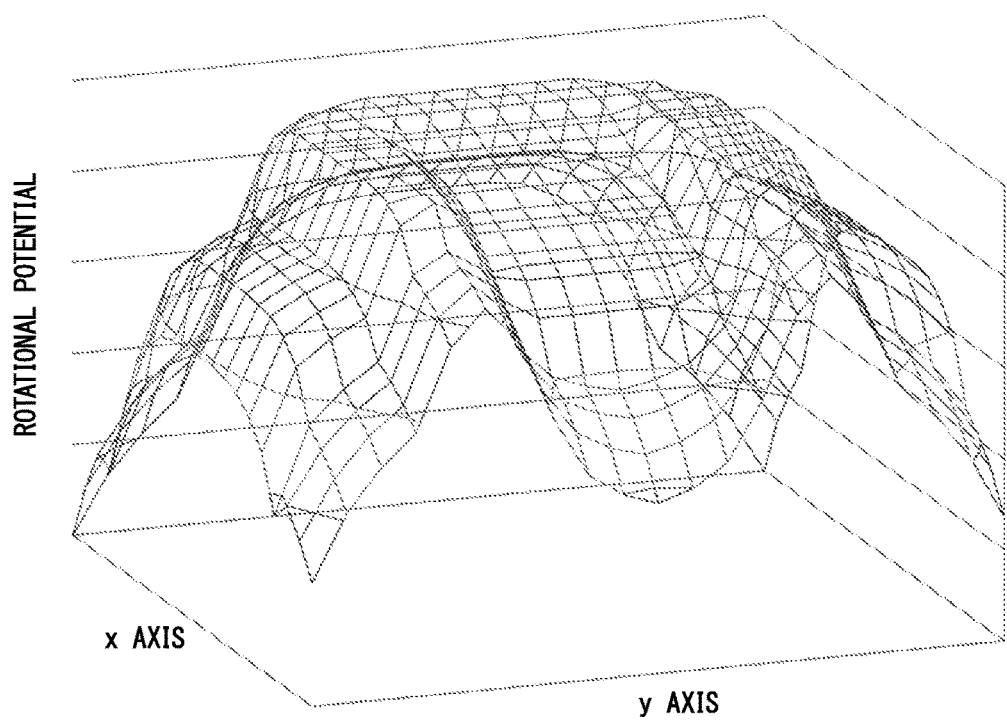
FIG. 11 is a diagram illustrating a graph illustrating an example of smooth rotational potential generated by a smoothing unit.

The smoothing unit 39 of the control unit 36 of the control device 30 generates the smooth potential illustrated in FIG. 11 by applying the low-pass filter to the discontinuously-varying potential in step S120 illustrated in FIG. 5. FIG. 11 is a diagram showing a graph illustrating an example of the smooth rotational potential generated by the smoothing unit 39. Since the smoothing unit 39 generates the smooth potential illustrated in FIG. 11, the robot control unit 40 can cause the robot 20 to perform a predetermined operation based on the smooth translational potential and the smooth rotational potential. As a result, it is possible to perform a good assembly operation using the impedance control based on the relative position and orientation of the operation target N and the assembly target O while suppressing a load applied to the actuators of the manipulator MNP.

Figure 12:
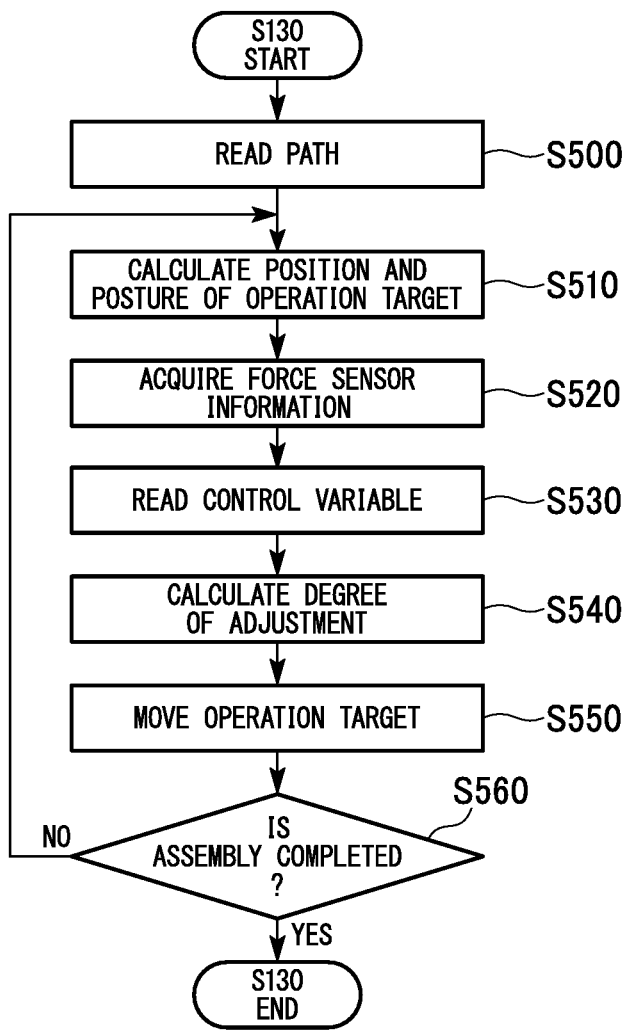
FIG. 12 is a flowchart illustrating an example of a process flow of a robot control process of step S130 illustrated in FIG. 5.

The robot control process of step S130 illustrated in FIG. 5 will be described below with reference to FIG. 12. FIG. 12 is a flowchart illustrating an example of a process flow of the robot control process of step S130 illustrated in FIG. 5.

(Step S500) First, the robot control unit 40 reads information indicating a moving path of the operation target N from the storage unit 32. The moving path of the operation target N refers to a moving path of the operation target N for reaching the position and orientation of the assembly target O when the operation target N is assembled into the assembly target O from the position and orientation of the operation target N at the present time (in the initial state). The information indicating the moving path is stored in advance in the storage unit 32, but may be calculated by the robot control unit 40 instead.

(Step S510) Then, the robot control unit 40 reads the rotational angles of the plurality of actuators of the robot 20 and calculates the position and orientation of the operation target N in the working area based on the read rotational angles using the forward kinematics.

(Step S520) Then, the robot control unit 40 acquires the force sensor information from the force sensor 21.

(Step S530) Then, the robot control unit 40 reads the control variable of the impedance control. It is assumed that the control variable of the impedance control is stored in advance in the storage unit 32.

(Step S540) Then, the robot control unit 40 calculates a degree of adjustment for adjusting the control variable read in step S530 based on the position and orientation of the operation target N in the working area calculated in step S510.

Now, the control variable of the impedance control and the degree of adjustment for adjusting the control variable will be described.

When an external force is applied to the end effector END gripping the operation target N (that is, when an external force is detected by the force sensor 21), the robot control unit 40 minutely moves the operation target N in a direction in which the external force is reduced such that an excessive force is not applied to the operation target N or the end effector END, regardless of the degree of movement $r_t$ in the direction along the moving path for assembling the operation target N into the assembly target O. The degree of micro-movement Δr of the operation target N is calculated based on the motion equation of Equation (3). The degree of movement $r_t$ and the degree of micro-movement Δr are vector quantities.

$$F_{ext} = M\Delta\ddot{r} + D\Delta\dot{r} + K\Delta r \quad (3)$$

$F_{ext}$ is a vector indicating an external force included in the force sensor information acquired from the force sensor 21 by the robot control unit 40 in step S520. M, D, and K are an inertia matrix, a viscosity matrix, and a stiffness matrix, respectively, and are control variables of the impedance control. The robot control unit 40 reads the control variables from the storage unit 32 in step S530. The robot control unit 40 calculates the degree of micro-movement Δr by solving Equation (3).

The degree of movement r when the robot control unit 40 moves the operation target N to cause the robot 20 to perform a predetermined operation is calculated from Equations (4) and (5) based on the degree of movement $r_t$ in the direction along the moving path read in step S500 and the degree of micro-movement Δr in the direction in which the force is reduced. The degree of movement r is a vector quantity.

$$r = r_t + T\Delta r \quad (4)$$

$$T = -0.45\left(1.0 - \frac{P_r(x, y)}{P_{rMAX}} + 1.0 - \frac{P_t(x, y)}{P_{tMAX}}\right) + 1.0 \quad (5)$$

T represents a quantity which is calculated based on the translational potential $P_t(x, y)$ and the rotational potential $P_r(x, y)$ at the coordinates (x, y) indicating the present position of the operation target N and represents a degree of adjustment for adjusting the magnitude of the degree of micro-movement Δr. $P_{tMAX}$ represents the maximum value of the translational potential $P_t(x, y)$, and $F_{rMAX}$ represents the maximum value of the rotational potential $P_r(x, y)$. The coefficient 0.45 in Equation (5) is an example of the optimal value with which the robot 20 is controlled well and which is experimentally acquired under certain conditions, and may be another value.

The adjusting of the degree of micro-movement Δr calculated using the control variables of the impedance control based on the degree of adjustment T as in Equation (4) corresponds to the indirect adjusting of the control variables of the impedance control. When the degree of adjustment T is large (that is, when the translational potential or the rotational potential is small), the degree of micro-movement in the direction in which the force is reduced is large (that is, the stiffness is low). On the other hand, when the degree of adjustment T is small (that is, when the translational potential or the rotational potential is large), the degree of micro-movement in the direction in which the force is reduced is small (that is, the stiffness is high).

The robot control unit 40 calculates the degree of adjustment T based on the translational potential $P_t(x, y)$ and the rotational potential $P_r(x, y)$ which smoothly vary and which are generated by the smoothing unit 39 in step S120 illustrated in FIG. 5 and Equation (5).

(Step S550) After the degree of adjustment T is calculated in step S540, the robot control unit 40 calculates the degree of micro-movement Δr based on the force sensor information acquired in step S510 and the control variables of the impedance control read in step S530. The robot control unit 40 calculates the degree of movement r based on the calculated degree of micro-movement Δr, the moving path calculated in step S500, the degree of adjustment T calculated in step S540, and Equation (4). Then, the robot control unit 40 moves the operation target N based on the calculated degree of movement r.

(Step S560) Then, the robot control unit 40 determines whether the operation target N has been assembled into the assembly target O based on the position and orientation of the operation target N after being moved in step S550.

(NO in step S560) When it is determined that the operation target N has not been assembled into the assembly target O, the robot control unit 40 calculates the position and orientation of the operation target N again in step S510.

(YES in step S560) When it is determined that the operation target N has been assembled into the assembly target O, the robot control unit 40 ends the process flow.

Instead of calculating the degree of adjustment T in step S540, the robot control unit 40 may calculate the inertia matrix M, the viscosity matrix D, and the stiffness matrix K which are the control variables of the impedance control based on the translational potential $P_t(x, y)$ and the rotational potential $P_r(x, y)$ which smoothly vary and which are generated by the smoothing unit 39 in step S120 illustrated in FIG. 5. In this case, the robot control unit 40 calculates the degree of micro-movement Δr based on the inertia matrix M, the viscosity matrix D, and the stiffness matrix K which are the calculated control variables of the impedance control and Equation (3) in step S550. Then, the robot control unit 40 calculates the degree of movement r based on Equation (4) in which a value greater than the maximum value calculated by Equation (5) is substituted for T. The value substituted for Equation (4) is 1 in this example, but may be a value equal to or greater than 1.

As described above, the robot system 1 according to the first embodiment adjusts (changes) the control variables of the compliant motion control depending on the relative position and orientation of the operation target N, which moves along with the manipulator MNP, and the assembly target O. Accordingly, the robot system 1 can perform the compliant motion control based on the relative position and orientation of the operation target N and the assembly target O.

The robot system 1 changes the parameter values of the compliant motion control depending on the movable range of the operation target N based on the relative position and orientation to the assembly target O. Accordingly, the robot system 1 can change the parameter values of the compliant motion control depending on the relative position and orientation even when the operation target N does not come in contact with the assembly target O.

The robot system 1 calculates the quantity as an index indicating the difficulty of movement or the ease of movement of the operation target N depending on the relative position and orientation of the operation target N and the assembly target O based on the movable range of the operation target N depending on the relative position and orientation to the assembly target O, and changes the parameter values of the compliant motion control based on the calculated quantity as an index. Accordingly, the robot system 1 can adjust the stiffness so as to decrease the stiffness of the operation target N when it is difficult to move the gripped operation target N and to increase the stiffness of the operation target N when it is easy to move the gripped operation target N.

The robot system 1 calculates the quantity as an index indicating the difficulty of movement or the ease of movement of the operation target N depending on the movable range of the operation target N based on the relative position and orientation to the assembly target O, and changes the parameter values of the compliant motion control based on the calculated quantity as an index.

The robot system 1 adjusts the control variables of the impedance control in the compliant motion control. Accordingly, the robot system 1 can adjust the stiffness of the operation target N gripped by the robot 20 by adjusting the control variables of the impedance control depending on the relative position and orientation of the operation target N and the assembly target O.

Second Embodiment

Hereinafter, a second embodiment of the present invention will be described with reference to the accompanying drawings. In the second embodiment, the control unit 36 includes a movable area calculating unit 37a instead of the movable area calculating unit 37. The movable area calculating unit 37a performs a movable area calculating process to be described below instead of the movable area calculating process of step S100 which is performed by the movable area calculating unit 37. More specifically, the movable area calculating unit 37a performs a translational movable area calculating process illustrated in FIG. 13 and a rotational movable area calculating process illustrated in FIG. 14 in step S100. In the second embodiment, the same components as in the first embodiment will be referenced by the same reference numerals.

Figure 13:
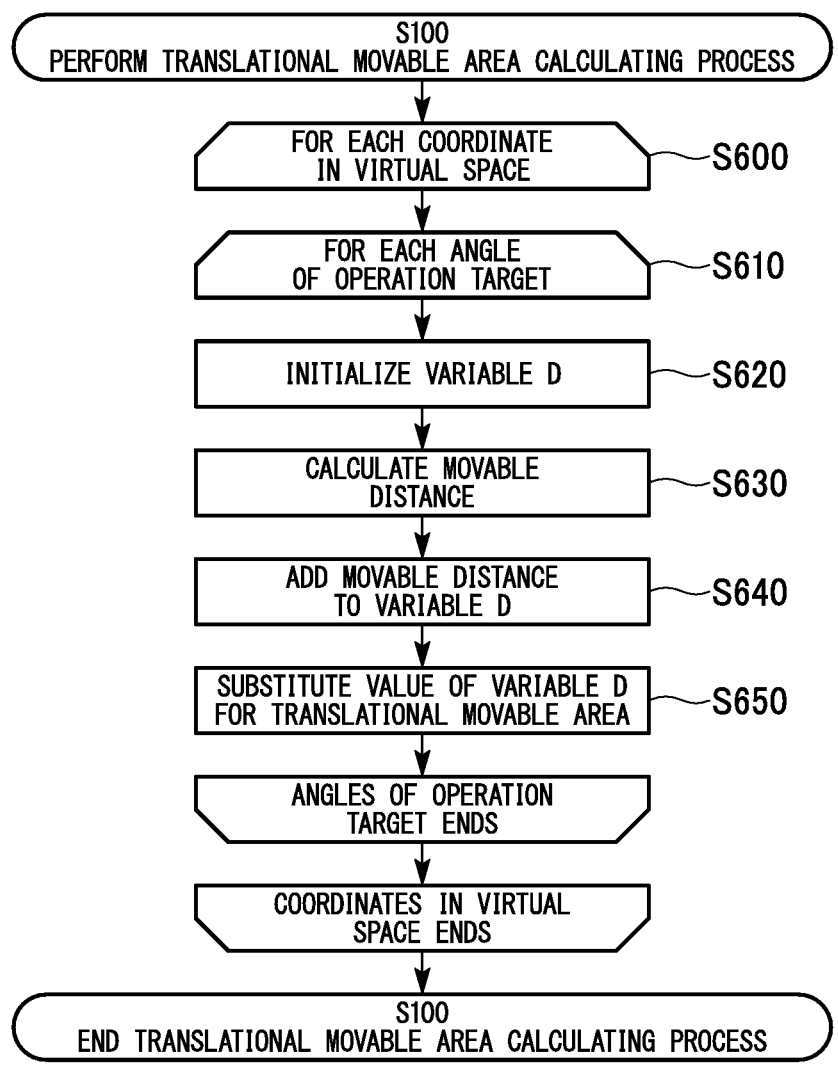
FIG. 13 is a flowchart illustrating an example of a process flow of a translational movable area calculating process by a movable area calculating unit.

The translational movable area calculating process which is performed by the movable area calculating unit 37a will be described below with reference to FIG. 13. FIG. 13 is a flowchart illustrating an example of a process flow of the translational movable area calculating process which is performed by the movable area calculating unit 37a. The translational movable area calculating process illustrated in FIG. 13 calculates the translational movable area as a function of a position and a posture, unlike the translational movable area calculating process of calculating the translational movable area as a function of position which is illustrated in FIG. 6.

(Step S600) First, the movable area calculating unit 37a reads information indicating a working area from the storage unit 32 and generates a virtual space indicating the working area based on the read information indicating the working area. The movable area calculating unit 37a selects the coordinates indicating the points in the generated virtual space one by one and repeatedly performs the processes of steps S610 to S650 for each selected coordinate.

(Step S610) Then, the movable area calculating unit 37a virtually arranges the operation target N at a point in the virtual space indicated by the coordinates selected in step S600. At this time, the movable area calculating unit 37a arranges the operation target N such that the position of the gravitational center of the operation target N matches the point in the virtual space. The movable area calculating unit 37a rotates the operation target N until the posture of the operation target N arranged at the point in the virtual space reaches a predetermined initial posture. Then, the movable area calculating unit 37a changes the posture of the operation target N by a predetermined angle and repeatedly performs the processes of steps S620 to S650 for each posture.

(Step S620) Then, the movable area calculating unit 37a generates a variable D which can store information indicating a numerical value and initializes the value of the variable D to zero.

(Step S630) Then, the movable area calculating unit 37a calculates the sum of distances by which the operation target N arranged with the posture selected in step S610 can move in four directions (that is, the positive x-axis direction, the negative x-axis direction, the positive y-axis direction, and the negative y-axis direction) at the point in the virtual space indicated by the coordinates selected in step S600.

(Step S640) Then, the movable area calculating unit 37a adds the sum of movable distances in the four directions calculated in step S630 to the value stored in the variable D generated in step S620.

Figure 14:
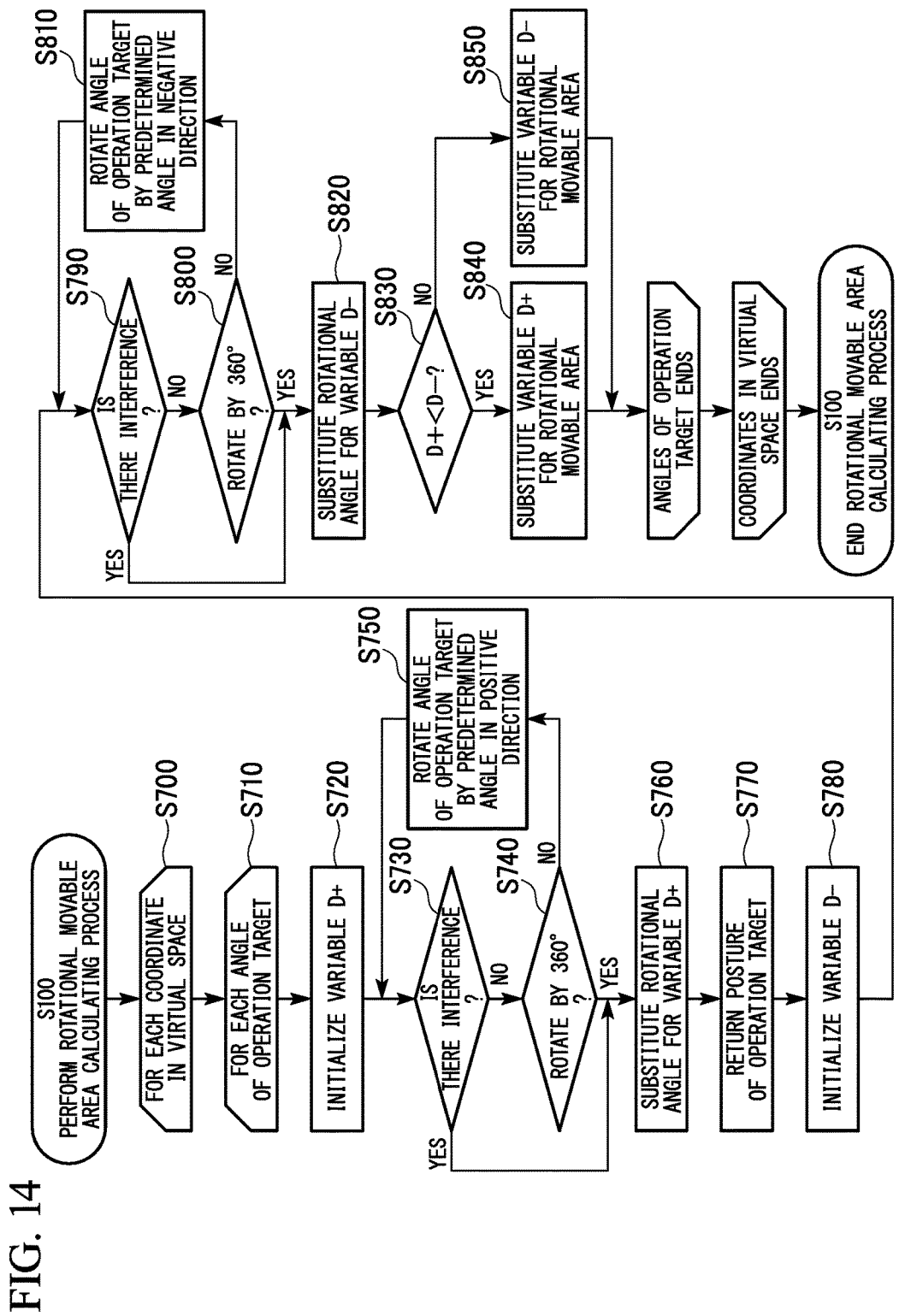
FIG. 14 is a flowchart illustrating an example of a process flow of a rotational movable area calculating process by the movable area calculating unit.

The rotational movable area calculating process which is performed by the movable area calculating unit 37a will be described below with reference to FIG. 14. FIG. 14 is a flowchart illustrating an example of a process flow of the rotational movable area calculating process which is performed by the movable area calculating unit 37a.

(Step S700) First, the movable area calculating unit 37a reads the information indicating the working area from the storage unit 32 and generates a virtual space indicating the working area based on the read information indicating the working area. Then, the movable area calculating unit 37a selects coordinates indicating the points in the generated virtual space one by one and repeatedly performs the processes of steps S710 to S850 for each selected coordinate. When the rotational movable area calculating process is performed by the movable area calculating unit 37a after (or in parallel with) the translational movable area calculating process illustrated in FIG. 13, the virtual space is already generated and thus the virtual space may not be newly generated in step S700.

(Step S710) Then, the movable area calculating unit 37a virtually arranges the operation target N at the point in the virtual space indicated by the coordinates selected in step S700. At this time, the movable area calculating unit 37a arranges the operation target N such that the position of the gravitational center of the operation target N matches the point in the virtual space. The movable area calculating unit 37*a* rotates the operation target N until the posture of the operation target N arranged at the point in the virtual space reaches a predetermined initial posture. Then, the movable area calculating unit 37*a* changes the posture of the operation target N by a predetermined angle and repeatedly performs the processes of steps S720 to S850 for each posture.

(Step S720) Then, the movable area calculating unit 37*a* generates a variable D+, which can store information indicating a numerical value, and initializes the value of the variable D+ to zero.

(Step S730) Then, the movable area calculating unit 37*a* determines whether the operation target N with the present posture which is the operation target N arranged at the point in the virtual space indicated by the coordinates selected in step S700 interferes with (that is, comes in contact with) the frame of the virtual space VS illustrated in FIG. 8 or the profile of the assembly target O.

(Step S740: NO in step S730) When it is determined that the operation target N does not come in contact with the frame of the virtual space VS or the profile of the assembly target O, the movable area calculating unit 37*a* determines whether the accumulated value of the rotational angles associated with the rotation of the operation target N in step S750 reaches 360°.

(Step S750: NO in step S740) When it is determined that the accumulated value of the rotational angles associated with the rotation of the operation target N does not reach 360°, the movable area calculating unit 37*a* rotates the operation target N with the present posture which is the operation target N arranged at the point in the virtual space indicated by the coordinates selected in step S700, for example, by a predetermined angle in the positive direction with respect to the gravitational center of the operation target N, and performs the determination of step S730 again. Here, the predetermined angle is preferably an arbitrary angle including 360° as a multiple thereof and may be 5° or 10° in an example, but may be another angle not including 360° as a multiple thereof.

(Step S760: YES in step S740) When it is determined that the accumulated value of the rotational angles associated with the rotation of the operation target N reaches 360°, the movable area calculating unit 37*a* substitutes the accumulated value of the rotational angles associated with the rotation of the operation target N in step S750 for the variable D+.

(YES in step S730) When it is determined in step S730 that the operation target N interferes with (that is, comes in contact with) the frame of the virtual space VS or the profile of the assembly target O, the movable area calculating unit 37*a* performs the process of step S760 to substitute the accumulated value of the rotational angles associated with the rotation of the operation target N in step S750 for the variable D+.

(Step S770) Then, the movable area calculating unit 37*a* returns the posture of the operation target N arranged at the point in the virtual space indicated by the coordinates selected in step S700 to the posture selected in step S710.

(Step S780) Then, the movable area calculating unit 37*a* generates a variable D−, which can store information indicating a numerical value, and initializes the value of the variable D− to zero.

(Step S790) Then, the movable area calculating unit 37*a* determines whether the operation target N with the present posture which is the operation target N arranged at the point in the virtual space indicated by the coordinates selected in step S700 interferes with (that is, comes in contact with) the frame of the virtual space VS illustrated in FIG. 8 or the profile of the assembly target O.

(Step S800: NO in step S790) When it is determined that the operation target N does not come in contact with the frame of the virtual space VS or the profile of the assembly target O, the movable area calculating unit 37*a* determines whether the accumulated value of the rotational angles associated with the rotation of the operation target N in step S810 reaches 360°.

(Step S810: NO in step S800) When it is determined that the accumulated value of the rotational angles associated with the rotation of the operation target N does not reach 360°, the movable area calculating unit 37*a* rotates the operation target N with the present posture which is the operation target N arranged at the point in the virtual space indicated by the coordinates selected in step S700, for example, by a predetermined angle in the negative direction with respect to the gravitational center of the operation target N, and performs the determination of step S790 again. Here, the predetermined angle is preferably an arbitrary angle including 360° as a multiple thereof and may be 5° or 10° in an example, but may be another angle not including 360° as a multiple thereof.

(Step S820: YES in step S800) When it is determined that the accumulated value of the rotational angles associated with the rotation of the operation target N reaches 360°, the movable area calculating unit 37*a* substitutes the accumulated value of the rotational angles associated with the rotation of the operation target N in step S810 for the variable D−.

(YES in step S790) When it is determined in step S790 that the operation target N interferes with (that is, comes in contact with) the frame of the virtual space VS or the profile of the assembly target O, the movable area calculating unit 37*a* performs the process of step S820 to substitute the accumulated value of the rotational angles associated with the rotation of the operation target N in step S810 for the variable D−.

(Step S830) Then, the movable area calculating unit 37*a* determines whether the value substituted for the variable D+ is less than the value substituted for the variable D−.

(Step S840: YES in step S830) When it is determined that the value substituted for the variable D+ is less than the value substituted for the variable D−, the movable area calculating unit 37*a* substitutes the value of the variable D+ for the rotational movable area.

(step S850: NO in step S830) When it is determined that the value substituted for the variable D+ is equal to or greater than the value substituted for the variable D−, the movable area calculating unit 37*a* substitutes the value of the variable D− for the rotational movable area.

In this way, the movable area calculating unit 37*a* calculates the translational movable area and the rotational movable area of the operation target N at each point in the working area for each posture of the operation target N by repeatedly performing the processes of steps S600 to S650 and the processes of steps S700 to S850. Accordingly, the control unit 36 can adjust the control variables of the compliant motion control based on the relative position and orientation of the operation target N and the assembly target O in the same way as in the first embodiment.

In step S730, the movable area calculating unit 37*a* may determine whether the value substituted for the variable D− is less than the value substituted for the variable D+. The movable area calculating unit 37*a* may reversely perform the processes of steps S730 to S760 and the processes of steps S780 to S820 or may simultaneously perform the processes.

As described above, the robot system 1 according to the second embodiment can achieve the same advantages as in the first embodiment by performing the translational movable area calculating process and the rotational movable area calculating process illustrated in FIGS. 13 and 14.

While the embodiments of the present invention have been described in detail with reference to the drawings, the specific configuration thereof is not limited to the embodiments, but may be changed, replaced, or deleted without departing from the gist of the present invention.

A program for realizing the functions of arbitrary units in the above-mentioned device (for example, the control device 30 of the robot system 1) may be recorded in a computer-readable recording medium and the program may be read and executed by a computer system. Here, the "computer system" includes an operating system (OS) or hardware such as peripherals. Examples of the "computer-readable recording medium" include a portable medium such as a flexible disk, a magneto-optical disc, a read only memory (ROM), and a compact disk (CD)-ROM and a storage device such as a hard disk built in a computer system. The "computer-readable recording medium" may include a medium that holds a program for a predetermined time, like a volatile memory (random access memory (RAM)) in a computer system serving as a server or a client when a program is transmitted via a network such as the Internet or a communication line such as a telephone circuit.

The program may be transmitted from the computer system having the program stored in the storage device or the like to another computer system via a transmission medium or by carrier waves in the transmission medium. The "transmission medium" for transmitting the program refers to a medium having a function of transmitting information such as a network (communication network) such as the Internet or a communication circuit (communication line) such as a telephone circuit.

The program may be provided to realize a part of the above-mentioned functions. The program may be a program capable of realizing the above-mentioned functions in combination with a program recorded in advance in a computer system, that is, a so-called differential file (differential program).

The entire disclosure of Japanese Patent Application No. 2014-198013, filed Sep. 29, 2014 is expressly incorporated by reference herein.

What is claimed is:

1. A robot comprising:
an arm; and
a control unit configured to control a motion of the arm using compliant motion control,
wherein the control unit configured to:
calculate a relative position of a first object moving along with the arm and a second object;
calculate a relative orientation of the first object and the second object; and
change a parameter value of the compliant motion control depending on the relative position and the relative orientation.

2. The robot according to claim 1, wherein the control unit changes the parameter value depending on a movable range of the first object based on the relative position and orientation to the second object.

3. The robot according to claim 2, wherein the control unit calculates a quantity as an index indicating difficulty of movement or ease of movement of the first object depending on the relative position and orientation of the first object and the second object based on the movable range and changes the parameter value based on the calculated quantity as the index.

4. The robot according to claim 1, wherein the control unit changes a parameter value of impedance control in the compliant motion control.

5. A robot system comprising:
a robot having an arm; and
a control device configured to control a motion of the arm using compliant motion control,
wherein the control device is configured to:
calculate a relative position of a first object moving along with the arm and a second object;
calculate a relative orientation of the first object and the second object, and
change a parameter value of the compliant motion control depending on the relative position and the relative orientation.

6. A control device for a robot comprising:
a processing unit; and
a communication unit connected to the processing unit and configured to selectively communicate with the robot,
wherein the processing unit is configured to:
calculate a relative position of a first object moving along with an arm of the robot and a second object;
calculate a relative orientation of the first object and the second object; and
change a parameter value of compliant motion control for controlling a motion of the arm depending on the relative position and the relative orientation.

7. A control method for a robot comprising:
calculating a relative position of a first object moving along with an arm of the robot and a second object;
calculating a relative orientation of the first object and the second object; and
changing a parameter value of compliant motion control for controlling a motion of the arm depending on the relative position and the relative orientation.

* * * * *

UNITED STATES PATENT AND TRADEMARK OFFICE
CERTIFICATE OF CORRECTION

PATENT NO. : 9,908,237 B2
APPLICATION NO. : 14/858287
DATED : March 6, 2018
INVENTOR(S) : Takashi Nammoto et al.

Page 1 of 1

It is certified that error appears in the above-identified patent and that said Letters Patent is hereby corrected as shown below:

(73) Assignees should read:
Seiko Epson Corporation (JP);
Tohoku University (JP)

Signed and Sealed this
Nineteenth Day of June, 2018

Andrei Iancu
*Director of the United States Patent and Trademark Office*